Figure 1:
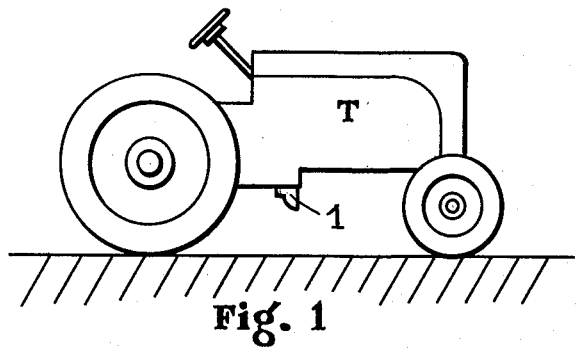

Aug. 14, 1956 W. B. CHALLMAN 2,759,056
ELECTRICALLY OPERATED TRACTOR-ANTI-TILTING DEVICE
Filed Sept. 2, 1953 2 Sheets-Sheet 1

INVENTOR
*William B. Challman*
BY *Charles K. Davies & Son*
ATTORNEYS

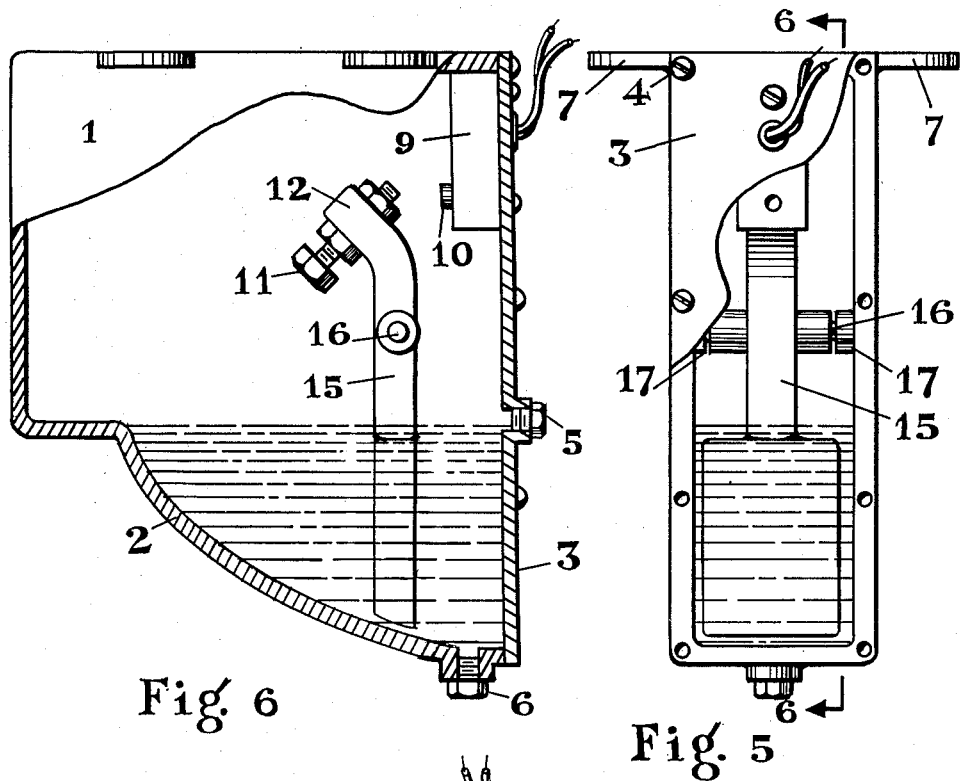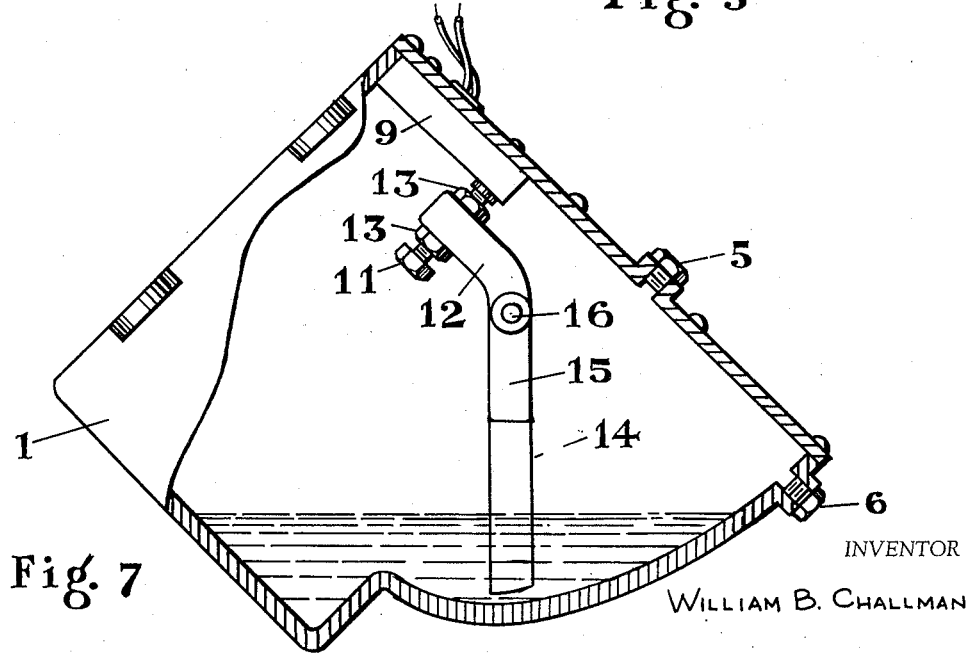

United States Patent Office 2,759,056
Patented Aug. 14, 1956

2,759,056

ELECTRICALLY OPERATED TRACTOR-ANTI-TILTING DEVICE

William B. Challman, Mount Vernon, Ind.

Application September 2, 1953, Serial No. 378,072

2 Claims. (Cl. 200—61.52)

The present invention relates to the general class of circuit breakers as applied to the ignition circuit of an electrically controlled power-operated tractor, or similar automotive vehicle, and more specifically to an electric circuit breaker and anti-tilting device for tractors that is attached to and carried by the tractor as a safety appliance.

In its physical embodiment the invention includes an initially and normally closed safety switch located in and adapted to positively break the electrical ignition circuit of the tractor, thereby cutting off power from the motor or engine of the tractor, or other similar automotive vehicle.

If and when the tractor thus equipped rides up a hazardous incline and tilts upwardly and rearwardly to a critical angle or inclination, the closed switch is automatically opened, the progress of the vehicle is stopped, and the ignition circuit remains open until the tractor returns to normal position. The safety switch, or circuit breaker, is of suitable type for automatic and mechanical operation in opening, and preferably, it is manually closed to insure and require attention of the driver or operator of the tractor after it has been opened in an emergency.

Thus the progress of the tractor is arrested on an incline, before attaining a tilted position at a critical angle, that might otherwise cause the tractor to rear backward and accidentally overturn, with possible injury to the driver or operator of the vehicle.

For coaction with and operation of the circuit breaker I utilize a pendulum-device located within a housing and suspended in a variable or changeable bath of oil, or other suitable liquid, and the pendulum device is controlled by force of gravity with a tendency to constantly assume a perpendicular or vertical position within the housing.

By variations in the quantity and density of the oil bath, the degrees of oscillations of the pendulum-weight submerged in the oil-bath are altered and controlled to accomplish the purposes and perform the functions of the invention. Under normal movements of the tractor, with the safety switch closed and the operator or activator of the switch in inoperative position, the weight of the pendulum swings in a deep and dense bath of oil, the activating device is thereby stabilized and its movement is retarded or dampened during normal vibrations due to ordinary starting, acceleration, and stopping of the tractor.

If and when the tractor starts up an incline, the upward and tilting movement of the tractor and the safety device carried thereby, results in a reduction in the quantity and density of the effective oil bath that surrounded the weight of the pendulum. Due to force of gravity the weighted pendulum remains in a vertical position while the relatively movable housing swings freely about the encircled activator, and as the tractor reaches a hazardous inclination, the movement of the housing, in combination with the stationary activator, pushes open the safety switch and breaks the ignition circuit.

The invention consists in certain novel features of construction, and combinations and arrangements of parts including the electrical appliances, as will hereinafter be more fully described and particularly pointed out in the appended claims.

In the accompanying drawings I have disclosed one physical embodiment of the invention that accords with a mode I have devised for the practical application of the principles of the invention; but it will be understood that changes and alterations are contemplated, and may be made in the mechanical structures and electrical elements illustrated, within the scope of my claims, without departing from the principles of the invention.

Figure 2:
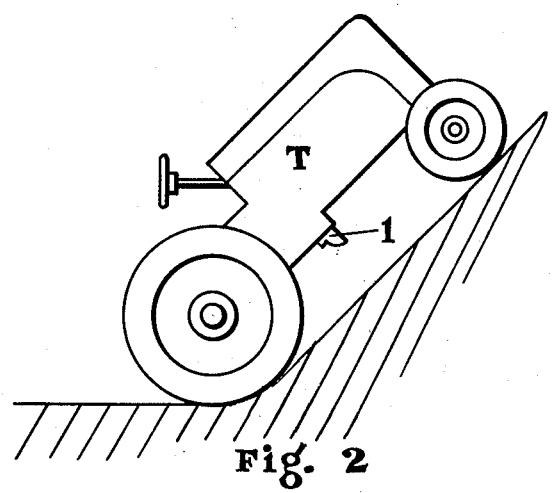
Figures 3, 4:
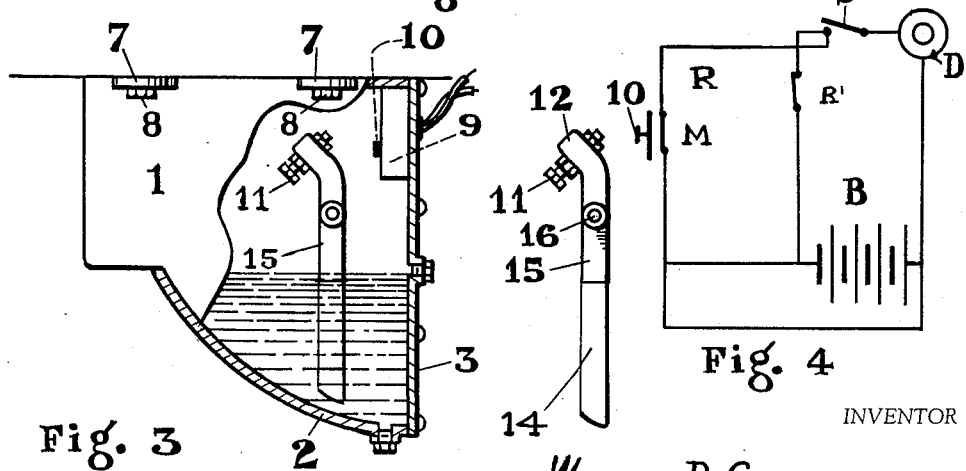

Figure 1 is a view in side elevation of a typical farm tractor equipped with the circuit breaker or safety device of my invention, depicted on level ground, and with its safety device out of action. Figure 2 shows the tractor ascending an incline at a critical angle that results in breaking the ignition circuit of the motor of the tractor. Figure 3 is an enlarged side view partly in section of the appliance, with parts in normal positions. Figure 4 is a diagrammatic view showing the pendulum device and a portion of the ignition circuit.

Figure 5 is an enlarged front edge view of the housing partly broken away to disclose its contained parts. Figure 6 is a vertical sectional view at line 6—6 of Figure 5, with parts in usual or normal position; and Figure 7 is a similar view with parts in position to activate the safety elements and break the electrical circuit.

In order that the general arrangement and relation of parts may readily be understood I have illustrated a typical tractor T; and in Figure 4 a partial diagram of the electrical ignition circuit of the tractor-motor that includes a battery B, the distributor D and the main switch S. As here shown the auxiliary control of the ignition circuit includes a closed circuit-breaker or safety-switch C, of the fall-away or non-reacting type interposed within the circuit in a suitable manner, which is adapted to be automatically and mechanically opened, and manually closed.

In equipping the tractor with the safety device of my invention I employ a closed housing or casing 1, the bottom of which is formed with an arcuate or curved wall 2 that forms a depressed well adapted to function in the nature of a dash-pot, or reservoir. This well forms a retarding and stabilizing chamber, and it contains a maximum quantity of oil in Figs. 3 and 6, while the lower angular portion of housing wall adjoining the well forms an oil-transfer chamber into which the oil from the well flows, when the housing, with the tractor, is tilted to a critical degree of inclination in Figs. 2 and 7.

An open front-end of the housing is equipped with a suitable closure, as a detachable plate 3 that is fastened in place by screws or bolts 4, to seal the interior of the well and the casing, and after the plate has been affixed a suitable quantity of oil is introduced into the interior of the housing, through a port in the end plate that is closed by a screw plug 5. A similar screw plug 6 is threaded into an outlet port in the arcuate wall of the well, which may be removed when necessary or desirable for draining oil from the housing.

For attaching the housing to a suitable portion or surface of the tractor, the housing is fastened with pairs of perforated, opposed, pairs of lugs or ears 7 that project laterally from the top portion of the housing, and bolts or screws 8 are employed for affixing the housing to the tractor in a selected position.

At the top portion, on the inside of the cover plate, a box 9 is mounted and spaced above the well 2, which box contains the initially and normally closed safety switch or circuit breaker of the ignition circuit, and the switch is fashioned with a push-pin 10 forming part of the movable contact of the switch. The push-pin projects through a suitable opening in a wall of the switch box 9, into the interior of the housing, above the well, and gravity controlled safety means within the housing are provided for activating, and coacting with the push-pin of the switch, for breaking the ignition circuit. For this purpose an adjustable abutment, or bolt 11 is mounted within the upper free end of a lever arm 12, and locked in adjusted position by a pair of lock nuts 13.

The oscillatable lever arm 12 forms an integral extension of a pendulum device that is pivotally suspended within the well of the housing, with its weight 14 normally submerged in the oil bath of the well, and the weight approximates a close fit within the walls of the housing to insure a dragging movement of the pendulum device.

The close fit between the pendulum and the enclosing case is provided so that the molecular friction of the oil between the sides and bottom of the case and the pendulum will have a retarding effect during oscillations of the pendulum in stopping and starting the tractor. This latter effect will, however, have no effect upon the desired movement of the pendulum when the tractor is tilted as the mass of oil would promptly drain into the sump therefor provided.

The stem 15 of the pendulum is provided with a transversely disposed pivot pin or hinge pin 16 with its opposite ends journaled in opposed bearings 17 located on the inner faces of the side walls of the housing; and this oscillatable control device or pendulum is initially mounted within the housing before the front end plate of the housing is affixed thereto. When the plate has been attached to the front open end of the housing, the push pin 10 of the micro-switch or circuit-breaker C, is thus positioned to move in an arcuate path with relation to the abutment or bolt 11, due to the upward and forward movement of the tractor and housing carried thereby. The adjustable bolt or abutment 11 of the pendulum also is capable of swinging in another arcuate path which intercepts the path of the push-pin, when the tractor rides up an inclination.

In the initial and normal position of the pendulum, the weight is submerged beneath the oil level within the well or reservoir, and any oscillating movements of the weight, due to ordinary irregularities in the ground surface over which the tractor is traveling, will be retarded or arrested to stabilize the pendulum and prevent inadvertent or accidental opening of the circuit breaker.

Should the tractor ascend an incline, as in Fig. 2, and thereby assume the dangerous position indicated, the oil content, or a major portion thereof is transferred by gravity from the well into the transfer chamber of the housing thereby permitting the housing-bearings to swing freely around the journal bearings of the pendulum as the housing swings upwardly and rearwardly.

In this upward tilting movement of the tractor, with the housing, to a critical angle, the heavily weighted pendulum due to the force of gravity, maintains its vertical or perpendicular position, while the housing with its closed safety switch rears backwardly until the push-pin 10 encounters and frictionally contacts the bolt or abutment 11 of the stationary pendulum. A slight continuation of the rearward movement of the housing while the push-pin and the abutment are in frictional contact, causes the switch to be opened, thus breaking the ignition circuit.

When the tractor is withdrawn from titled position of Fig. 2 to the normal position of Fig. 1, the housing swings forwardly and downwardly disengaging the push-pin and the abutment, the oil content of the transfer chamber is restored to the well to stabilize the pendulum, and the safety switch may be manually reset to close the ignition switch, which as usual is controlled by the main switch S.

In Figs. 1 and 2 the housing is shown attached to bottom of the tractor-frame, but it will be understood that the housing may be carried at any desired and suitable location on the tractor, preferably between the wheel mounts and forwardly of the rear wheels. The abutment or bolt may be adjusted for coaction with the push-pin of the switch in adapting the appliance to different sizes or types of tractors, and changes may be made in the relative arrangement of the interior of the housing and the weighted pendulum.

Having thus fully described my invention, what I claim as new and desire to secure by Letters Patent is:

1. In the safety appliance described, the combination with an upright, tiltable, housing having an initially vacant oil-transfer chamber, and a depressed oil-well formed with an arcuate bottom wall, and a normally closed electrical safety switch mounted in the housing above the oil-well, of a pendulum pivotally mounted in the housing and having a weight submerged in the contents of the oil-well and terminating in molecular frictional relation with said bottom wall, and an abutment carried by the pendulum in the path of tilting movement of the switch within the housing, whereby at a critical angle of inclination of the housing and switch, the oil-content of the well flows into the transfer chamber and the switch is opened by frictional engagement with the abutment and tilting movement of the housing and switch, and whereby the pendulum movement is dampened and retarded until the said upright housing is titled at the said critical angle.

2. In the safety appliance described, the combination with an upright, tiltable, housing having an initially vacant oil transfer chamber and a depressed oil-well formed with an arcuate bottom wall, and a normally closed electrical safety switch mounted in the housing above the oil-well, of a pendulum pivotally mounted in the housing and having a curved bottom weight submerged in the contents of the oil-well and terminating in molecular frictional relation with the said arcuate bottom wall, and an abutment carried by the pendulum in the path of tilting movement of the switch within the housing, whereby minor variations from the perpendicular position of the pendulum are retarded and dampened by the oil-contents but upon tilting of the housing to a critical angle the oil flows into the transfer chamber and contact between the abutment and the switch is permitted.

References Cited in the file of this patent

UNITED STATES PATENTS

| | | |
|---|---|---|
| 1,175,062 | Johnson | Mar. 14, 1916 |
| 1,411,298 | Osborn | Apr. 4, 1922 |
| 2,365,262 | Gair | Dec. 19, 1944 |